United States Patent
Mori et al.

(10) Patent No.: US 12,534,402 B2
(45) Date of Patent: Jan. 27, 2026

(54) PRODUCTION METHOD FOR CEMENT CLINKER AND CEMENT CLINKER POWDER

(71) Applicant: Tokuyama Corporation, Shunan (JP)

(72) Inventors: Akiyoshi Mori, Shunan (JP); Takashi Chabayashi, Shunan (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 1041 days.

(21) Appl. No.: 17/442,658

(22) PCT Filed: Mar. 13, 2020

(86) PCT No.: PCT/JP2020/011179
§ 371 (c)(1),
(2) Date: Sep. 24, 2021

(87) PCT Pub. No.: WO2020/195970
PCT Pub. Date: Oct. 1, 2020

(65) Prior Publication Data
US 2022/0169566 A1    Jun. 2, 2022

(30) Foreign Application Priority Data
Mar. 27, 2019  (JP) .................................. 2019-059586

(51) Int. Cl.
C04B 7/47    (2006.01)
(52) U.S. Cl.
CPC .................................. C04B 7/47 (2013.01)

(58) Field of Classification Search
None
See application file for complete search history.

(56) References Cited

U.S. PATENT DOCUMENTS 8,864,902 B2    10/2014    Nagata et al.

FOREIGN PATENT DOCUMENTS

| JP | 2009-084105 A | 4/2009 |
| JP | 2017-095312 A | 6/2017 |
| JP | 2017-095936 A | 6/2017 |
| JP | 2017-105648 A | 6/2017 |

OTHER PUBLICATIONS

Machine translation of Shingo et al., JP2017095312A (Year: 2017).*
A machine translation of Jun et al., JP 2009084105A Jun. 2009.*
(Continued)

Primary Examiner — Keling Zhang
(74) Attorney, Agent, or Firm — Keating & Bennett, LLP

(57) ABSTRACT

Portland cement clinker that includes $C_3A$ and $C_4AF$ in total from 22 to 40 mass % calculated by Bogue's formulas and has an iron modulus (I.M.) of 0.8 to 1.3 is produced. The burned raw materials are annealed at a cooling rate of 20 degree Celsius or lower at least to 1200 degree Celsius so that the lightness of the cement clinker is made high. When annealing till lower temperatures, the lightness value becomes generally higher, but the effect becomes negligible lower at 1000 degree Celsius. Therefore, the raw materials are quenched at 1000 degree Celsius and lower for improving the productiveness.

1 Claim, 2 Drawing Sheets

(56) References Cited

OTHER PUBLICATIONS

Official Communication issued in International Patent Application No. PCT/JP2020/011179, mailed on May 19, 2020.
Kasai, "The Concrete", Jun. 10, 1998, 7 pages.
Kusama et al., "Albedo Measurement of Toyoura Standard Sand and Decomposed Granite Sand by Box Method", The 67th Annual Meeting of Japan Society of Civil Engineers, Sep. 2012, 7 pages.
Oyepata, et al., "Modelling of Clinker Cooler and Evaluation of Its Performance in Clinker Cooling Process for Cement Plants", Nigerian Journal of Technology (NIJOTECH) vol. 39, No. 4, Oct. 2020, pp. 1093-1099.
Acuña, et al., "Virtual-Lab of a Cement Clinker Cooler for Operator Training", IFAC Proceedings Volumes, vol. 45, Issue 2, 2012, 8 pages.
Agico Cement, "Clinker Grate Cooler", https://www.cementmillequipment.com/cooling/clinker-grate-cooler.html, retrieved Dec. 17, 2024, 9 pages.
Arai, "Third edition, Material Chemistry of Cement—3 The composition and structure of cement clinker", Dainippon Publishing Co. Ltd., Aug. 8, 2019, pp. 94-99.

\* cited by examiner

PRODUCTION METHOD FOR CEMENT CLINKER AND CEMENT CLINKER POWDER

FIELD OF THE INVENTION

The present invention relates to a production method for a Portland cement clinker configured to be burned at a relatively low temperature and adjusted to have a high lightness, and the produced cement clinker powder.

BACKGROUND ART

The cement industry is a mass-production and mass-consumption industry, and resource-saving and energy-saving are the most important issues. For example, to produce Portland cement, which has been most largely produced, the raw materials adjusted to have predetermined chemical compositions are burned at a high temperature of 1450 to 1550 degree Celsius to produce the clinker. Here, the burning step is the most energy-consuming. In other words, the reduction in the burning temperature of the clinker results in energy-saving. For lowering the burning temperature of the clinker, a new technology that increases the concentration of $C_4AF$ ($4CaO-Al_2O_3-Fe_2O_3$), one of the major components of the clinker, has been developed (Patent Document 1).

Another important issue is to use effectively waste products and by-products, regarding recent global environmental problems. The cement industry has effectively used or disposed of waste products, as the raw materials or the fuel for producing cement, in consideration of the features of the cement production equipment. This has effectively allowed the mass and safe disposal of waste products. Many waste products and by-products have a large $Al_2O_3$ content. Since the above system has the higher $C_4AF$ content, the $Al_2O_3$ content in the cement clinker is increased than conventional Portland cement clinkers. This allows using of more waste products and by-products than conventional Portland cement clinkers. The clinker according to Patent Document 1 is superior also in this regard.

The cement clinker according to Patent Document 1 includes rich $C_4AF$ for burning at the lower temperature and therefore includes rich $Fe_2O_3$. Having the increased $Fe_2O_3$ content, the cement produced from the cement clinker has another color tone in comparison to that of conventional Portland cement and tends that L value indicating the lightness decreases. When the cement has a different color tone from that of conventional Portland cement, it is expected for the cement to alter the color tone locally when used as a repairing material, and the cement has the problem that the use is restricted in a viewpoint of the aesthetics. For overcoming the problem, if the $Fe_2O_3$ content is decreased, the burning at the lower temperature becomes difficult, and the important energy-saving effect of the clinker can not be adequately obtained.

Technologies have been proposed for obtaining cement with high lightness values from the clinker burned at the lower temperature: one using a specific iron raw material (Patent Document 2); and one adding a bright powder (Patent Document 3). However, the method according to Patent Document 2 does not afford enough lightness, and the method according to Patent Document 3 requires a higher production cost.

PRIOR DOCUMENT LIST

Patent Document

Patent Document 1: JP5665638B
Patent Document 2: JP2017-95312A
Patent Document 3: JP2017-105648A

SUMMARY OF THE INVENTION

Problems to be Solved by the Invention

Therefore, the object of the present invention is to provide the production method of a new cement clinker that can be produced at a lower burning temperature than conventional Portland cement clinkers and has an equivalent color tone to those of the conventional Portland cement clinkers and also to provide the produced cement clinker powder.

Means for Solving the Problems

The present inventors have intensively studied for solving the above problems, found that the control of cement clinker temperature at burning, in particular, the cooling temperature and time duration at the cooling can adjust the lightness of the cement clinker, and thus, accomplished the present invention.

The present invention produces Portland cement clinker, including $C_3A$ and $C_4AF$ in total from 22 to 40 mass % calculated by Bogue's formulas, and having an iron modulus (I.M.) of 0.8 to 1.3, by burning the raw materials at 1300 to 1400 degree Celsius and then cooling the burned raw materials of the Portland cement clinker after burning. The present invention is characterized by, in said cooling, annealing the raw materials after the burning at a cooling rate of 20 degree Celsius or lower at least to 1200 degree Celsius and then quenching the raw materials from at lowest 1000 degree Celsius. In this specification, when a range is designated such as 22 to 40%, the upper and the lower limits are inclusive.

the Portland cement clinker powder according to the present invention includes $C_3A$ and $C_4AF$ in total from 22 to 40 mass % calculated by Bogue's formulas, has an iron modulus (I.M.) of 0.8 to 1.3, has a Blaine specific surface area of 2800 to 4500 $cm^2/g$, and has an L value of at least 50 in Lab color system.

Advantageous Effects of the Invention

According to the present invention, new cement clinker is provided such that it is configured to be burned at a lower temperature and allows a larger usage in quantities of waste products and by-products than conventional Portland cement clinkers, and that it has an equivalent lightness to conventional Portland cement clinkers.

THE BEST EMBODIMENT FOR CARRYING OUT THE INVENTION

Figure 1:
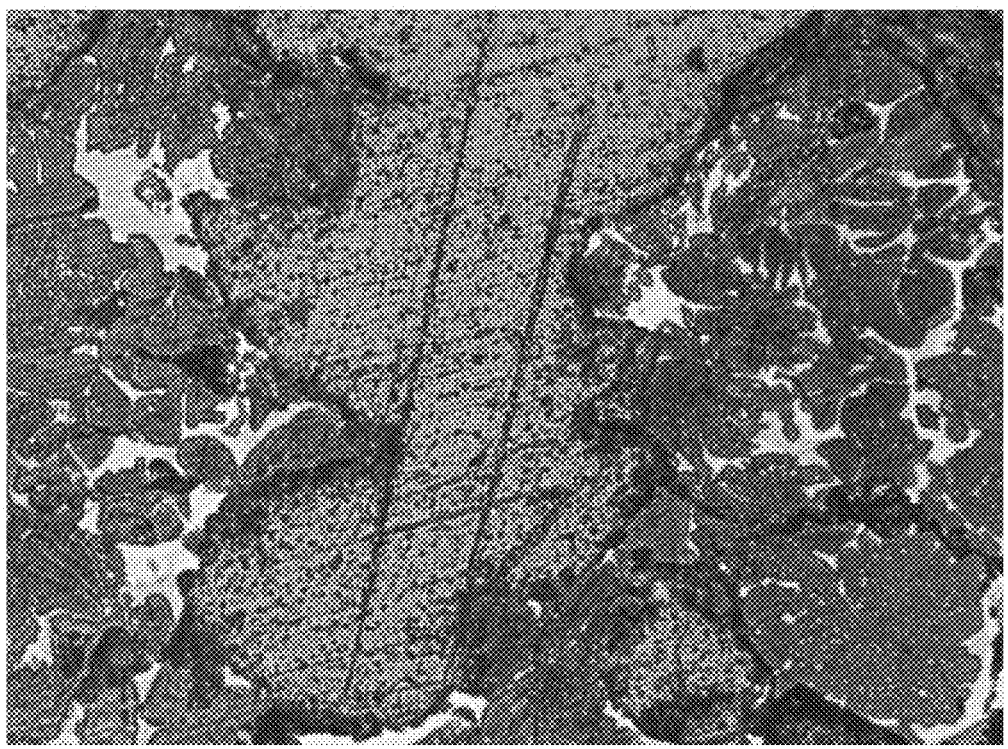
FIG. 1 A polarized microscopic image indicating the $C_2S$ structure in the cement clinker, burned at 1350 degree Celsius, annealed to 1200 degree Celsius at a rate of 20 degree Celsius per minute, and then quenched to 200 degree Celsius. The field of view is about 300 micro-meter×225 micro-meter.

The quantities of $C_3A$, $C_4AF$, and $C_3S$ in the present invention are calculated by the Bogue's formulas.

The Bogue's formulas have been used along with various indexes and moduli and well-known calculation formulas for calculating approximate major compound compositions from major chemical analysis values. The method for determining the contents of minerals in clinker according to the Bogue's formulas will be described as follows, for reference purpose. The contents are described in mass % unit.

Content of $C_3S = (4.07 \times CaO) - (7.60 \times SiO_2) - (6.72 \times Al_2O_3) - (1.43 \times Fe_2O_3)$.

Content of $C_2S = (2.87 \times SiO_2) - (0.754 \times C_3S)$.

Content of $C_3A = (2.65 \times Al_2O_3) - (1.69 \times Fe_2O_3)$.

Content of $C_4AF = 3.04 \times Fe_2O_3$.

Iron modulus (I.M.), together with hydraulic modulus (H.M.), silica modulus (S.M.), activity index (A.I.), and lime saturation degree (L.S.D.), is calculated from major chemical analysis values. The iron modulus (I.M.) is a characteristic value for the production control of clinker, and has been used as one of the relevant indexes and moduli and has been well-known. The calculation method of the iron modulus and other indexes will be described as follows.

Hydraulic modulus (H.M.) = $CaO/(SiO_2 + Al_2O_3 + Fe_2O_3)$.

Silica modulus (S.M.) = $SiO_2/(Al_2O_3 + Fe_2O_3)$.

Iron modulus (I.M.) = $Al_2O_3/Fe_2O_3$.

Activity index (A.I.) = $SiO_2/Al_2O_3$.

Lime Saturation Degree (L.S.D.) = $CaO/(2.8 \times SiO_2 + 1.2 \times Al_2O_3 + 0.65 \times Fe_2O_3)$.

The above CaO, $SiO_2$, $Al_2O_3$, and $Fe_2O_3$ contents can be measured according to JIS R 5202 "Chemical Analysis Method of Portland Cement" and JIS R 5204 "Fluorescent X-ray Analysis Method of Portland Cement."

The cement clinker produced by the present invention has a total content of $C_3A$ and $C_4AF$ from 22 to 40%. When the total content is under 22%, it becomes difficult to produce cement clinker having desirable properties such as strength developing property, by the burning at 1300 to 1400 degree Celsius. The total content is preferably 24% or more. On the other hand, the $C_3S$ content is preferably 60% or more for better strength developing property as described later. Therefore, the total content of $C_3A$ and $C_4AF$ is 40% or less, preferably 35% or less, more preferably 32% or less, and particularly preferably 28% or less. Between $C_4AF$ and $C_3A$, $C_4AF$ contributes to proceed the sintering at the lower temperature and the reduction in free CaO content in the clinker, and therefore, the $C_4AF$ content is preferably 15% or more.

The $C_3S$ content has a high influence on the strength developing property of the cement composition (hereinafter, simply referred to as "cement") using the cement clinker according to the present invention. When the content is 60% or more, a good strength developing property is easily achieved. The $C_3S$ content is more preferably 62% or more and particularly preferably 63% or more. As already described, the total content of $C_3A$ and $C_4AF$ is at least 22%, and therefore, the upper limit of $C_3S$ is 78%. For keeping a desirable time duration from the start of setting to the end of setting, the content is preferably 70% or less and more preferably 65% or less.

The cement clinker produced according to the present invention may further include $C_2S$. The content is 18% or less and preferably 3% or more. For better long-term strength, it is particularly preferable to make the total content of $C_3S$ and $C_2S$ 69% or more.

The iron modulus (I.M.) in the cement clinker produced according to the present invention is 0.8 to 1.3. If the iron modulus exceeds 1.3, enough strength developing property (more specifically, for example, mortar strength development) can not be achieved, even when other conditions are satisfied in the cement clinker according to the present invention. In addition, when the iron modulus exceeds 1.3, the time duration from the start of setting to its end becomes easily too long, and therefore, the iron modulus is 1.3 or less. A more preferable range of iron modulus is 1.0 to 1.3 and it is 1.14 to 1.27, particularly preferably.

While the hydraulic modulus and the silica modulus are not particularly limited, however, for a good balance between various properties, the hydraulic modulus is preferably 1.8 to 2.2 and particularly preferably 1.9 to 2.1. The silica modulus is preferably 1.0 to 2.0 and particularly preferably 1.1 to 1.7.

In the production method for cement clinker according to the present invention, the raw materials for the clinker are prepared and mixed by known adequate methods. For example, raw materials such as waste materials, by-products, and other materials (CaO sources such as limestone, quick lime, and slaked lime, $SiO_2$ sources such as silica stone, $Al_2O_3$ sources such as clay and coal ash, and $Fe_2O_3$ sources such as copper slag and blast furnace slag) are chemically analyzed in advance, the mixing ratios of the raw materials are calculated from the compositions of the raw materials such that those requirements according to the present invention are satisfied, and they are mixed at the ratios.

The same raw materials for the production of conventional cement clinkers can be used in the production method according to the present invention without specific restrictions. Of course, waste products and by-products can be used.

Usable waste products and by-products are, for example, as follows: blast furnace slag, steel slag, manganese slag, coal ash, sewage sludge, waterworks sludge, paper sludge, dirt produced by construction, casting sand, soot, incinerated fly ash, molten fly ash, chlorine by-path dust, wood, waste white clay, coal debris, waste tires, shells, dust, and its incinerated ash. Some of them are cement raw materials and others are heat energy sources.

In the conventional productions of cement clinkers, the mixtures of those raw materials are burned at burning temperatures about 1450 degree Celsius for predetermined periods in burning equipment (for example, in SP kilns or NSP kilns) and then normally immediately quenched to about 200 degree Celsius, at a cooling rate of more than 100 degree Celsius per minute, in cooling equipment called "clinker-coolers" comprising air blowers or sprinklers.

In contrast to this, in the production of cement clinkers having a total amount of $C_3A$ and $C_4AF$ from 22 to 40% and an iron modulus (I.M.) from 0.8 to 1.3, the burning temperature can be lowered from 1300 to 1400 degree Celsius, and the production becomes energy-saving.

However, the cement clinkers of the above compositions have generally lower lightness (L values in the Lab color system) than normal Portland cement clinkers; the L values are usually below 50 and in many cases, below 48.

For overcoming the above problem, according to the present invention, the cement clinkers burned at the lower temperature are annealed at a cooling ratio not higher than 20 degree Celsius per minute at least from 1300 degree Celsius to 1200 degree Celsius after the burning. Hereinafter, this process is sometimes called "annealing." The cement clinkers produced through the annealing have significantly higher lightnesses (brightness) in comparison with conventional cement clinkers quenched in the same temperature range.

While the specific mechanism for this is further to be investigated, the speculated factors are phase transition including another phase from the phase resultant from the quenching and the changes of the clinker mineral crystals in their sizes and shapes, when annealed.

In addition, the present inventors have found further annealing in the temperature range below 1000 degree Celsius did not improve the lightness. Moreover, annealing at 1000 degree Celsius or lower needs significant time for the production of cement clinkers and lowers the productivity. Therefore, according to the present invention, quenching is performed at 1000 degree Celsius or lower, similarly to the conventional production.

When quenching is started at temperatures of 1000 degree Celsius or higher, the lightness increases at the lower quenching start temperatures. However, the productivity decreases as described above. Therefore, considering the two factors, the quenching is set to start between 1200 degree Celsius and 1000 degree Celsius.

The cement clinker produced according to the present invention can be converted to cement by pulverization with gypsum or mixing them after separate pulverization, similarly to conventional cement clinkers. Examples of types of the cement produced are ordinary Portland cement, early-strength Portland cement, and super early-strength Portland cement. They can be used, other than to Portland cement, in various mixed types of cement and as components of solidification agents, such as soil solidification agents.

When gypsum is added for converting the clinker into cement, gypsum known as cement raw material, such as gypsum dihydrate, gypsum hemihydrate, and anhydrous gypsum, can be used without limitations. Preferably, gypsum is added such that the $SO_3$ concentration in the cement is from 1.5 to 5.0 mass % and more preferably, from 1.8 to 3.0 mass %. The cement clinker and gypsum can be pulverized by known methods without limitations.

The above cement can include and be pulverized with an admixture such as blast furnace slag, siliceous admixture, fly ash, calcium carbonate, and limestone, and/or a pulverizing agent. They can be pulverized separately and then mixed with them. These additives can be mixed with gypsum or separately mixed. In addition, chlorine by-path dust or the like can be mixed.

While the fineness of cement is not particularly limited, its Blaine specific surface area is preferably 2800 to 4500 $cm^2/g$.

When the cement clinker without any additives is pulverized, and when its lightness (L value) is measured, the cement clinker according to the production method of the present invention has a lightness of 50 or more. As already described, if the quenching start temperature is further lowered, the lightness can be 52 or more. However, in most cases, the lightness is 55 or less.

While the greater Blaine specific surface areas generally afford the larger L values, the finer pulverization is not preferable due to the production cost and so on. The Portland cement clinker including 22 to 40% of $C_3A$ and $C_4AF$ in total, having a high iron content, in reduction to the iron modulus (I.M.), 0.8 to 1.3, having a Blaine specific surface area of 2800 to 4500 $cm^2/g$, and having the L value of 50 or more is produced according to the production method of the present invention. It has not been produced by conventional methods, If needed, the Portland cement clinker according to the present invention is mixed, after the pulverization, with blast furnace slag, fly ash, or the like, to produce blast furnace cement, fly ash cement, or the like.

Embodiment

The following embodiments describe the constitution and advantageous effects of the present invention. The present invention is not limited to these embodiments.

The raw materials comprising limestone, silica stone, coal ash, and iron slag, respectively of predetermined amounts, were mixed such that the mixtures after burning have the mineral compositions in Table 1. The mixtures were burned at 1450 degree Celsius or 1350 degree Celsius in an electric furnace and then cooled under predetermined conditions for respective examples, to cement clinkers. The mixtures were kept for 90 minutes at the highest temperature and the burning atmosphere was air, as in the usual method. The resultant cement clinkers were pulverized by a ball mill to the Blaine specific surface area became 3300 plus/minus 50 $cm^2/g$. Then, the color tone of the clinker powders was measured by a spectro-photometer. The production conditions and measured values are listed in Table 1. The spectro-photometer was Spectro-Photometer SE6000 by Nippon Denshoku Industries, Ltd.

TABLE 1

Quenching Start temperature, Clinker Composition, Three Moduli, and Color Value

| | Quenching Start temperature | Composition | | | | Three Moduli | | | Color Value | | |
|---|---|---|---|---|---|---|---|---|---|---|---|
| | (Degree Celsius) | $C_3S$ | $C_2S$ | $C_3A$ | $C_4AF$ | H.M. | S.M. | I.M. | L | a | b |
| Reference | 1450 | 65 | 13.1 | 9.6 | 9.4 | 2.20 | 2.49 | 1.81 | 51.9 | −1.2 | 6.3 |
| Comp. 1 | 1350 | 64 | 6.2 | 8.7 | 17.3 | 2.07 | 1.51 | 1.21 | 45.8 | −0.9 | 5.8 |
| Emb. 1 | 1200 | 64.4 | 6.6 | 8.7 | 17.5 | 2.04 | 1.51 | 1.21 | 50.9 | −0.9 | 4.9 |
| Emb. 2 | 1100 | 64.7 | 6.3 | 8.7 | 17.4 | 2.05 | 1.51 | 1.21 | 52.5 | −1.1 | 5.5 |

*The compositions are in mass %.
*In the reference, quenching was started from the maximum temperature of 1450 degree Celsius, and in the comparative example 1, quenching was started from the maximum temperature of 1350 degree Celsius.
*In the embodiments 1 and 2, the clinkers were annealed from the maximum temperature of 1350 degree Celsius to 1200 degree Celsius (Emb. 1) or 1100 degree Celsius (Emb. 2) at 20 degree Celsius per minute and then quenched.

The reference indicates the production of Portland cement clinker of conventional standard composition: burning at 1450 degree Celsius, and quenching from 1450 degree Celsius at a usual quenching rate larger than 100 degree Celsius per minute.

The cement clinker in the comparative example 1 included $C_3A$ and $C_4AF$ by 26% in total and had an iron modulus of 1.21 and was configured to be burned at the lower temperature. It was burned at 1350 degree Celsius and quenched from 1350 degree Celsius at a usual cooling rate greater than 100 degree Celsius.

In the embodiments 1 and 2 of the present invention, the raw materials were prepared to have the same composition to the comparative example 1, burned at 1350 degree Celsius, annealed to 1200 degree Celsius or 1100 degree Celsius at a cooling rate of 20 degree Celsius per minute, and then quenched by air-blow at a usual cooling rate larger than 100 degree Celsius.

The cement produced according to the production method of the present invention has a large iron content, is configured to be burned at the lower temperature, and has a lightness equivalent to that of the reference comprising a conventional Portland cement clinker.

Figure 2:
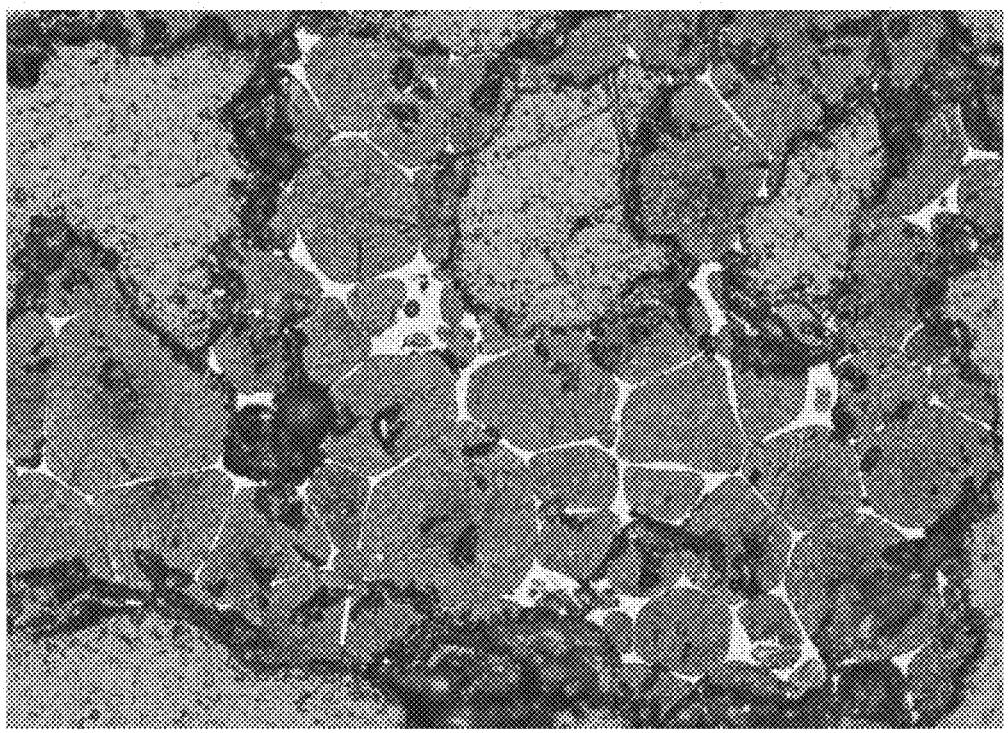
FIG. 2 A polarized microscopic image indicating the $C_2S$ structure in the cement clinker, burned at 1350 degree Celsius and immediately quenched to 200 degree Celsius. The field of view is about 300 micro-meter×225 micrometer.
Figure 3:
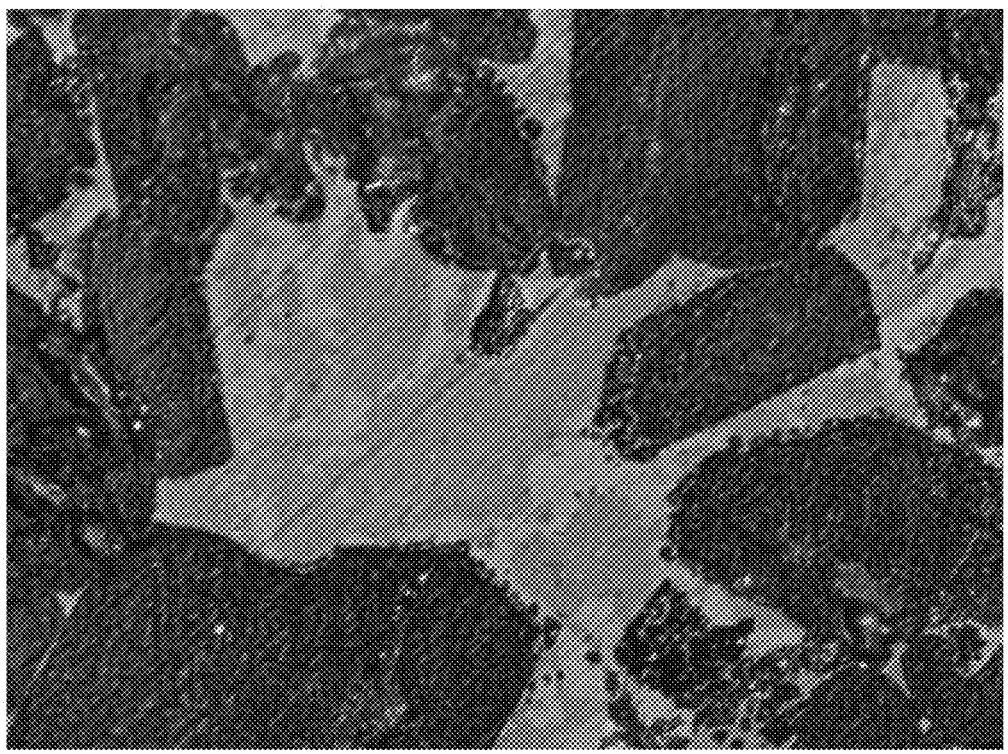
FIG. 3 A polarized microscopic image indicating the interstitial phase structure in the cement clinker, burned at 1350 degree Celsius, annealed to 1200 degree Celsius at a rate of 20 degree Celsius per minute, and then quenched to 200 degree Celsius. The field of view is about 125 micro-meter×90 micro-meter.
Figure 4:
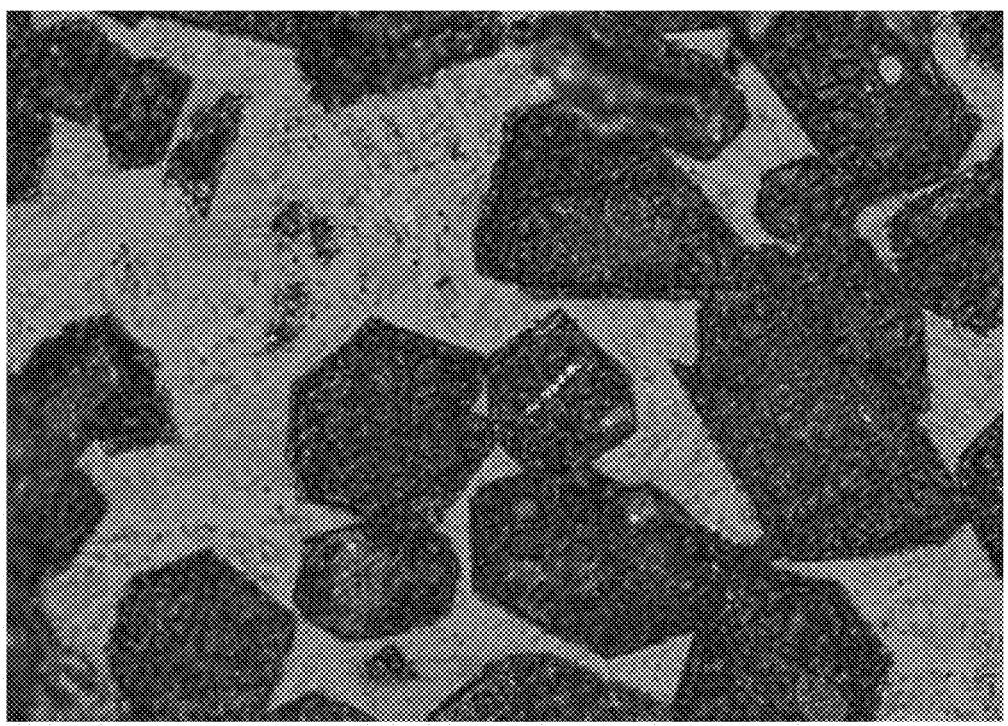
FIG. 4 A polarized microscopic image indicating the interstitial phase structure in the cement clinker, burned at 1350 degree Celsius and immediately quenched to 200 degree Celsius. The field of view is about 125 micro-meter× 90 micro-meter.

FIGS. 1 and 3 indicate the mineral structure of a cement clinker powder corresponding to the embodiment 1; FIG. 1 indicates the $C_2S$ structure, and FIG. 3 indicates the interstitial phase structure comprising $C_3A$ and $C_4AF$. FIGS. 2 and 4 indicate the mineral structure of a cement clinker powder corresponding to the comparative example 1; FIG. 2 indicates the $C_2S$ structure, and FIG. 4 indicates the interstitial phase structure comprising $C_3A$ and $C_4AF$. By the way, the portion in FIG. 1 extending from the upper central position to the lower position is a void. In addition, the white structure occupying the gap between particles in FIGS. 1 and 2 comprises the interstitial phase. In FIGS. 3 and 4, the gray structure at gaps between particles comprises the interstitial phase; the dark area comprises $C_4AF$ structure, and the bright area comprises $C_3A$ structure.

When comparing FIGS. 1 and 2, the size of annealed $C_2S$ particles in FIG. 1 is smaller than that in FIG. 2, and the shape of the particles in FIG. 1 is different from that in FIG. 2. When comparing FIGS. 3 and 4, the $C_3A$ structure and $C_4AF$ structure in the annealed interstitial phase are mutually separated in FIG. 3, while the $C_3A$ structure and $C_4AF$ structure in the quenched interstitial phase are mutually mixed in FIG. 4. In addition, since $C_2S$ experiences several phase transitions at 1200 degree Celsius and lower, the crystalline phase of $C_2S$ can be different between the annealing and the quenching.

As already known, the size and shape of particles influence lightness. Generally, different crystalline phases afford different lightnesses. When annealed, impurities are excluded from crystal structures, and therefore, the lightness of powders increases generally. Lightness is estimated to increase when the dark $C_4AF$ structure and the bright $C_3A$ structure are separated in comparison with a uniform mixture. Improvement in the lightness of annealed cement clinker powder is estimated to be due to these factors.

When commercially carrying out the present invention, the burning is performed in a rotary kiln or the like, the annealing and quenching are performed in a clinker-cooler or the like. The adequate clinker-cooler has, for example, multi-stages; the annealing is performed at the first stage or the first and second stages, and the air-blow to the first stage or the first and second stages is reduced or set to 0 so that the cooling rate is made 20 degree Celsius per minute or lower.

Since the slow annealing rate makes the clinker-cooler larger in the size, the cooling rate at the annealing is preferably 20 degree Celsius per minute or lower and 5 degree Celsius per minute or larger. In the quenching, the cooling rate is 40 degree Celsius per minute or larger and 500 degree Celsius per minute or smaller, and preferably 100 degree Celsius per minute or larger and 500 degree Celsius per minute or smaller.

The cement clinker temperatures at the annealing and the quenching are measured, for example, by a radiation thermometer at plural positions in the clinker-cooler. The measured temperatures are converted into the cooling rate with use of the moving speed of the cement clinker in the clinker-cooler.

What is claimed is:

1. A production method for Portland cement clinker including $C_3A$ and $C_4AF$ in total from 22 to 40 mass % calculated by Bogue's formulas and having an iron modulus (I.M.) of 0.8 to 1.3, carrying out a step for cooling raw materials of the Portland cement clinker after burning the raw materials at 1300 to 1400 degree Celsius, being characterized by,
in the step for cooling, cooling the raw materials after the burning at a cooling rate of 20 degree Celsius per minute or lower, to a temperature at or below 1200 degree Celsius and then quenching the raw materials from a temperature at or above 1000 degree Celsius, wherein
the burning of the raw materials is performed in a rotary kiln, and the cooling of the raw materials is performed in a clinker-cooler.

* * * * *